(12) United States Patent
Eswaran et al.

(10) Patent No.: US 8,621,058 B2
(45) Date of Patent: Dec. 31, 2013

(54) PROVIDING CLOUD-BASED COMPUTING SERVICES

(75) Inventors: Anand Eswaran, Karnataka (IN); Vamsi Krishna Devaki, Karnataka (IN); Srinivas Guntupalli, Karnataka (IN); Vishwas Venkatesh Pai, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 299 days.

(21) Appl. No.: 13/095,219

(22) Filed: Apr. 27, 2011

(65) Prior Publication Data

US 2012/0110462 A1 May 3, 2012

(30) Foreign Application Priority Data

Oct. 28, 2010 (IN) ............................ 3216/CHE/2010

(51) Int. Cl.
*G06F 15/16* (2006.01)
*G06F 15/173* (2006.01)

(52) U.S. Cl.
USPC ........... 709/223; 709/224; 709/225; 709/226; 709/228; 709/229; 718/104; 726/1

(58) Field of Classification Search
USPC ................. 709/223–226, 228, 229; 715/736; 718/104; 726/1
See application file for complete search history.

(56) References Cited

U.S. PATENT DOCUMENTS

| | | | |
|---|---|---|---|
| 7,213,065 B2 | 5/2007 | Watt | |
| 7,945,640 B1* | 5/2011 | VanTine | 709/217 |
| 8,140,666 B2* | 3/2012 | Dias et al. | 709/224 |
| 8,346,225 B2* | 1/2013 | Raleigh | 455/414.1 |
| 8,447,883 B1* | 5/2013 | Hasson et al. | 709/238 |
| 2008/0040196 A1* | 2/2008 | Coon et al. | 705/10 |
| 2008/0080552 A1* | 4/2008 | Gates et al. | 370/468 |
| 2009/0187970 A1 | 7/2009 | Mower et al. | |
| 2009/0276771 A1* | 11/2009 | Nickolov et al. | 717/177 |
| 2010/0077449 A1* | 3/2010 | Kwok et al. | 726/3 |
| 2010/0251329 A1* | 9/2010 | Wei | 726/1 |
| 2010/0268764 A1* | 10/2010 | Wee et al. | 709/203 |
| 2011/0076985 A1* | 3/2011 | Chami et al. | 455/405 |
| 2011/0110381 A1* | 5/2011 | Atkinson et al. | 370/419 |
| 2011/0145094 A1* | 6/2011 | Dawson et al. | 705/26.63 |

(Continued)

FOREIGN PATENT DOCUMENTS

WO 2009111799 A2 9/2009

OTHER PUBLICATIONS

"HP Introduces Industry's First Business-ready Infrastructure for Automated Service Delivery in Data Centers", < http://www.hp.com/hpinfo/newsroom/press/2009/090420c.html > Publication Date: Apr. 20, 2009 >.

(Continued)

*Primary Examiner* — Alina N. Boutah

(57) ABSTRACT

In a method for providing a cloud-based computing service to a user, a request for the computing service to be performed for the user is received, in which, the request includes a selection of at least one flow-slice, the at least one flow-slice comprising a network abstraction of a network pay-per-use unit. In addition, workloads to be performed by a plurality of infrastructure components to satisfy the at least one flow-slice are estimated and a provisioning scheme for the plurality of infrastructure components to implement the estimated workloads on the plurality of infrastructure components is determined.

20 Claims, 5 Drawing Sheets

(56) References Cited

U.S. PATENT DOCUMENTS

| | | | |
|---|---|---|---|
| 2011/0164596 A1* | 7/2011 | Montemurro et al. | 370/338 |
| 2011/0213712 A1* | 9/2011 | Hadar et al. | 705/80 |
| 2011/0231899 A1* | 9/2011 | Pulier et al. | 726/1 |
| 2011/0238797 A1* | 9/2011 | Wee | 709/220 |
| 2011/0264805 A1* | 10/2011 | Breitgand et al. | 709/226 |
| 2011/0296052 A1* | 12/2011 | Guo et al. | 709/240 |
| 2011/0307898 A1* | 12/2011 | Fischer et al. | 718/104 |
| 2011/0313902 A1* | 12/2011 | Liu et al. | 705/34 |
| 2011/0320546 A1* | 12/2011 | Holden | 709/206 |
| 2012/0047240 A1* | 2/2012 | Keohane et al. | 709/221 |
| 2012/0054175 A1* | 3/2012 | Barsness et al. | 707/719 |
| 2012/0072318 A1* | 3/2012 | Akiyama et al. | 705/30 |
| 2012/0072571 A1* | 3/2012 | Orzell et al. | 709/224 |
| 2012/0072581 A1* | 3/2012 | Tung et al. | 709/224 |
| 2012/0131591 A1* | 5/2012 | Moorthi et al. | 718/104 |
| 2012/0179824 A1* | 7/2012 | Jackson | 709/226 |
| 2013/0007114 A1* | 1/2013 | Wee et al. | 709/203 |
| 2013/0019011 A1* | 1/2013 | Breitgand et al. | 709/224 |
| 2013/0031158 A1* | 1/2013 | Salsburg | 709/203 |
| 2013/0080655 A1* | 3/2013 | Barsness et al. | 709/231 |
| 2013/0204970 A1* | 8/2013 | Ohara | 709/217 |

OTHER PUBLICATIONS

"Template-Based Automated Service Provisioning—Supporting the Agreement-Driven Service Life-Cycle" < http://www.econbiz.de/archiv/ka/uka/information/service_provisioning_supporting.pdf > 2005, pp. 283-295.

* cited by examiner

PROVIDING CLOUD-BASED COMPUTING SERVICES

CLAIM FOR PRIORITY

The present application claims priority under 35 U.S.C 119 to Indian application number 3216/CHE/2010, filed on Oct. 28, 2010, which is incorporated by reference in its entirety.

BACKGROUND

Many organizations rely heavily on a relatively large number of computers and other information technology (IT) equipment that are networked together in the performance of various computing services. As the technological requirements continue to increase, the monetary costs, as well as, the personnel required to maintain the equipment continue to increase dramatically. Oftentimes, however, the organizations are located in areas where there is no or limited IT staff available to operate the IT equipment and networks. In addition, the organizations are typically unable or unwilling to obtain the space required for the IT equipment as well as to set up and run the IT equipment.

One solution to meeting some of the needs of the organizations, while avoiding many of the costs associated with those needs, is for the organizations to purchase computing and networking services from a cloud-based networking service provider on an "as-needed" basis. Cloud-based networking service providers typically employ a number of data centers that house a number of IT equipment that run on shared virtualized resource pools that are accessible via Intranets or the Internet. In these arrangements, the cloud-based networking service providers often charge the organizations fees based solely upon the amount of bandwidth that the organizations reserve.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
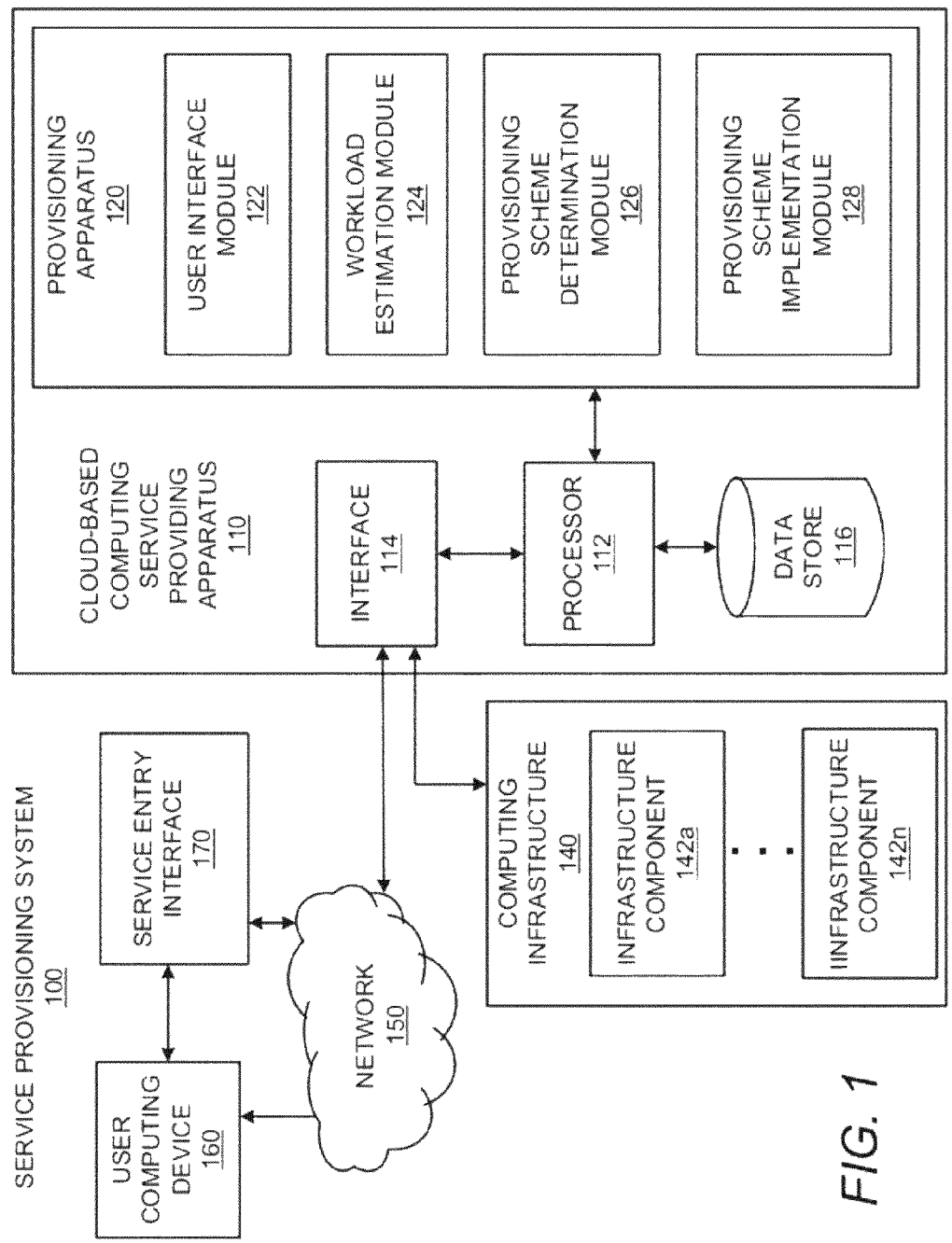
FIG. 1 illustrates a block diagram of a service provisioning system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures are not described in detail so as not to unnecessarily obscure the description of the present disclosure.

Disclosed herein are methods and apparatuses for providing cloud-based computing services to users. The methods and apparatuses disclosed herein provide users with a greater range of choices in requesting for computing services from a cloud-based service provider as compared with conventional cloud-based arrangements. For instance, in addition to bandwidth, the users are able to define the quality of service they would like to receive, the level of security applied to their computing services, etc. In one regard, the methods and apparatuses disclosed herein generally enable the users to build their application within an infrastructure over the cloud to basically mimic an infrastructure that they would build on their own premises. To the users, therefore, there is relatively little difference in the infrastructure over the cloud and an infrastructure that the users could build and manage themselves.

In addition, the methods and apparatuses disclosed herein enable users to select the various parameters associated with the performance of the requested computing services without having to know the underlying physical network details and/or detailed networking domain. In one regard, this is accomplished through a service entry request tool that provides a graphical user interface (GUI) through which the users may relatively easily select their desired parameters for the requested computing services.

Moreover, the methods and apparatuses disclosed herein enable cloud-based computing service providers to provide the requested services while substantially optimizing computing infrastructure usage and meeting of service level agreement guarantees.

Through implementation of the methods and apparatuses disclosed herein, therefore, users may request for and receive computing services over the cloud that meets many of the same parameters as computing services that the users could receive through building and managing an on-site infrastructure, without the cost and personnel required to perform the computing services themselves.

Throughout the present disclosure, the term "n" following a reference numeral is intended to denote an integer value that is greater than 1. In addition, the terms "a" and "an" are intended to denote at least one of a particular element. As used herein, the term "includes" means includes but not limited to, the term "including" means including but not limited to. The term "based on" means based at least in part on.

With reference first to FIG. 1, there is shown a block diagram of a service provisioning system 100, according to an example. In one regard, the methods disclosed herein below may be implemented in the system 100 as discussed in greater detail herein below. It should be understood that the system 100 may include additional elements and that some of the elements described herein may be removed and/or modified without departing from a scope of the system 100.

The service provisioning system 100 is depicted as including a cloud-based computing service providing apparatus 110, a computing infrastructure 140, a network 150, a user computing device 160, and a service entry interface 170. The cloud-based computing service providing apparatus 110 is also depicted as including a processor 112, an interface 114, a data store 116, and a provisioning apparatus 120. The computing infrastructure 140 is further depicted as including a plurality of infrastructure components 142a-142n. Generally speaking, the computing infrastructure 140 comprises a shared virtualized resource pool, which comprises a cloud computing environment where services run on shared virtualized resource pools that are accessible via the network 150, which may comprise Intranets and/or the Internet. By way of example, the computing infrastructure 140 comprises at least one data center and the infrastructure components 142a-142n comprise servers, firewalls, routers, switches, hard drives, etc., as well as other components for performing computing services.

The provisioning apparatus 120 is further depicted as including a user interface module 122, a workload estimation module 124, a provisioning scheme determination module 126, and a provisioning scheme implementation module 128. The modules 122-128 may comprise modules with machine readable instructions, hardware modules, or a combination of modules with machine readable instructions and hardware modules. Thus, in one example, one or more of the modules 122-128 comprise circuit components, in which case, the provisioning apparatus 120 may comprise a circuit board. In another example, one or more of the modules 122-128 comprise machine readable instructions stored on a computer readable storage medium, which is executable by the processor 112, in which case the provisioning apparatus 120 may comprise a disk drive or other type of memory.

In any regard, the processor 112 is configured to implement and/or execute the provisioning apparatus 120. Thus, for instance, the cloud-based computing service providing apparatus 110 may comprise a computing device and the provisioning apparatus 120 may comprise an integrated and/or add-on hardware device of the computing device. As another example, the provisioning apparatus 120 may comprise a computer readable storage device upon which machine readable instructions for each of the modules 122-128 are stored and executed by the processor 112.

As further shown in FIG. 1, the processor 112 is configured to communicate with the computing infrastructure 140 through the interface 114. The interface 114 may comprise hardware and/or machine readable instructions for communication of data to and from the cloud-based computing service providing apparatus 110. Although the computing infrastructure 140 has been depicted as communicating directly with the interface 114, the computing infrastructure 140 may instead communicate with the interface 114 through the network 150. In this regard, the cloud-based computing service providing apparatus 110 may be remotely located from the computing infrastructure 140.

The processor 112 is to receive various information pertaining to the computing infrastructure 140 through the connection with the computing infrastructure 140. The various information may include, for instance, an identification of the infrastructure components 142a-142n contained in the computing infrastructure 140, a network topology of the infrastructure components 142a-142n contained in the computing infrastructure 140, various operating characteristics of the infrastructure components 142a-142a, various characteristics of the connections between the computing components 142a-142n, etc. The processor 112 may store the various information received from the computing infrastructure 140 in the data store 116, which may comprise volatile and/or non-volatile memory, such as DRAM, EEPROM, MRAM, phase change RAM (PCRAM), Memristor, flash memory, and the like. In addition, or alternatively, the data store 116 may comprise a device configured to read from and write to a removable media, such as, a floppy disk, a CD-ROM, a DVD-ROM, or other optical or magnetic media.

The processor 112 is also to receive information from the user computing device 160 through the interface 114, which may also be stored in the data store 116. The user computing device 160 comprises one of a personal computer, a laptop computer, a tablet computer, a personal digital assistant, a cellular telephone, etc., through which a user may access the service entry interface 170 to submit a request for cloud-based computing service from the cloud-based computing service providing apparatus 110. The service entry interface 170 may comprise, for instance, a web-based interface through which a user may define various aspects of the requested computing service. The service entry interface 170 may also comprise an application that may be locally stored or executed on the user computing device 160, in which the information that the service entry interface 170 collects is communicated to the cloud-based computing service providing apparatus 110 over the network 150. Various examples of the service entry interface 170 are provided below.

According to an example, the cloud-based computing service providing apparatus 110 supplies the user computing device 160 with the service entry interface 170 to therefore directly receive information pertaining to the requested computing service from the user computing device 160.

Figure 2:
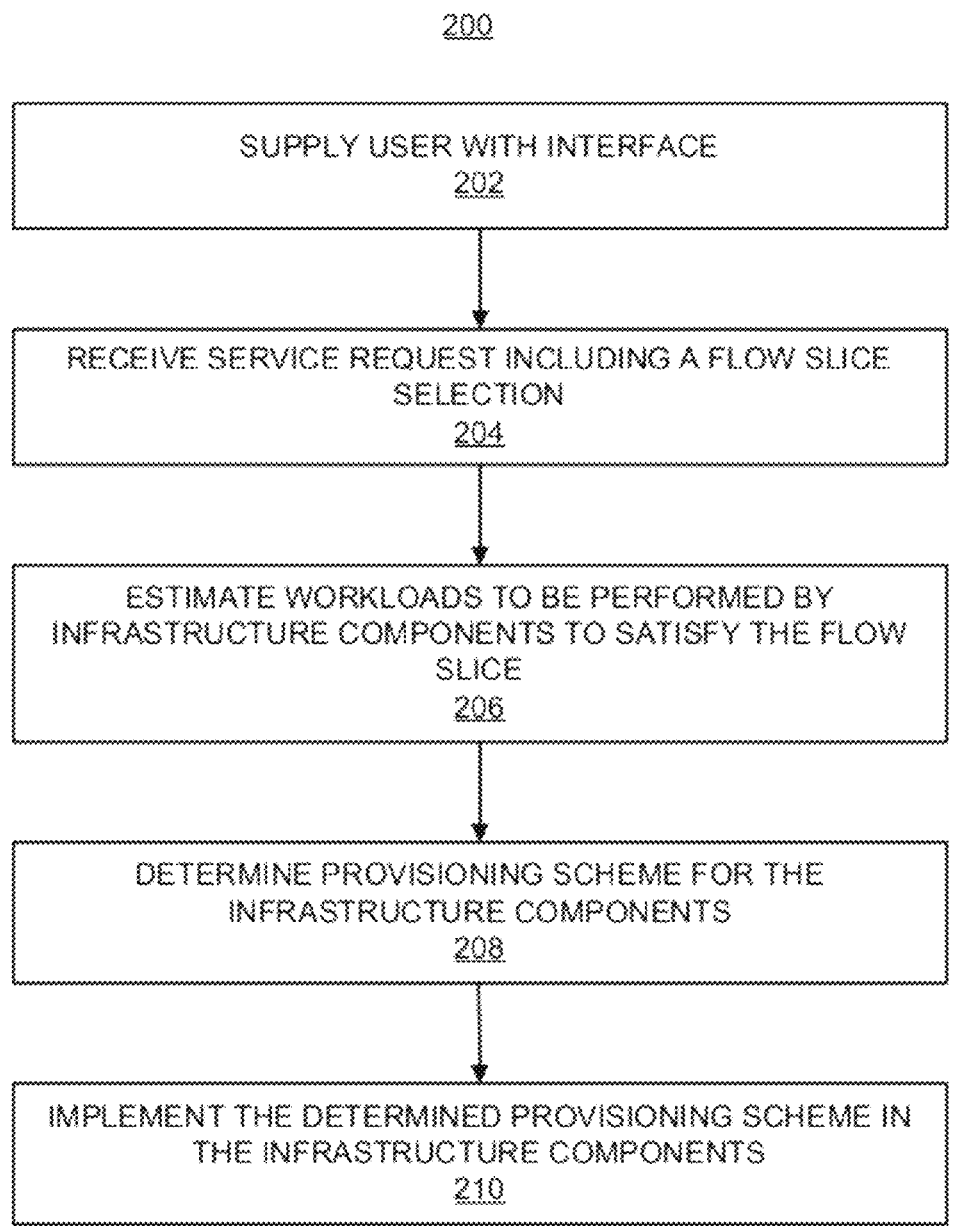
FIG. 2 illustrates a flow diagram of a method for providing a cloud-based computing service to a user, according to an example of the present disclosure.

Various manners in which the cloud-based computing service 110, and more particularly, the modules 122-128 of the provisioning apparatus 120 may be implemented are described in greater detail with respect to FIG. 2, which depicts a flow diagram of a method 200 for providing a cloud-based computing service to a user, according to an example. It should be apparent that the method 200 represents a generalized illustration and that other steps may be added or existing steps may be removed, modified or rearranged without departing from a scope of the method 200.

The description of the method 200 is made with particular reference to the provisioning apparatus 120 depicted in FIG. 1. It should, however, be understood that the method 200 may be implemented in an apparatus that differs from the provisioning apparatus 120 without departing from the scope of the method 200.

At block 202, a service entry interface 170 through which a user may input a request for a cloud-based computing service is supplied to a user, for instance, by the user interface module 122. The supply of the service entry interface 170 may be optional in various instances, for instance, when the user computing device 160 includes or implements a locally operated application that provides an interface through which the user may input information pertaining to the request. A flow diagram of a method 300, according to an example, in which a service entry interface tool 422 (FIG. 4) may be implemented to receive the user request is provided in FIG. 3A. In addition, a screenshot 320 of the service entry interface 170, which may be provided by the service entry interface tool 422 and is depicted as a graphical user interface (GUI), is depicted in FIG. 3B, according to an example.

Figure 3A:
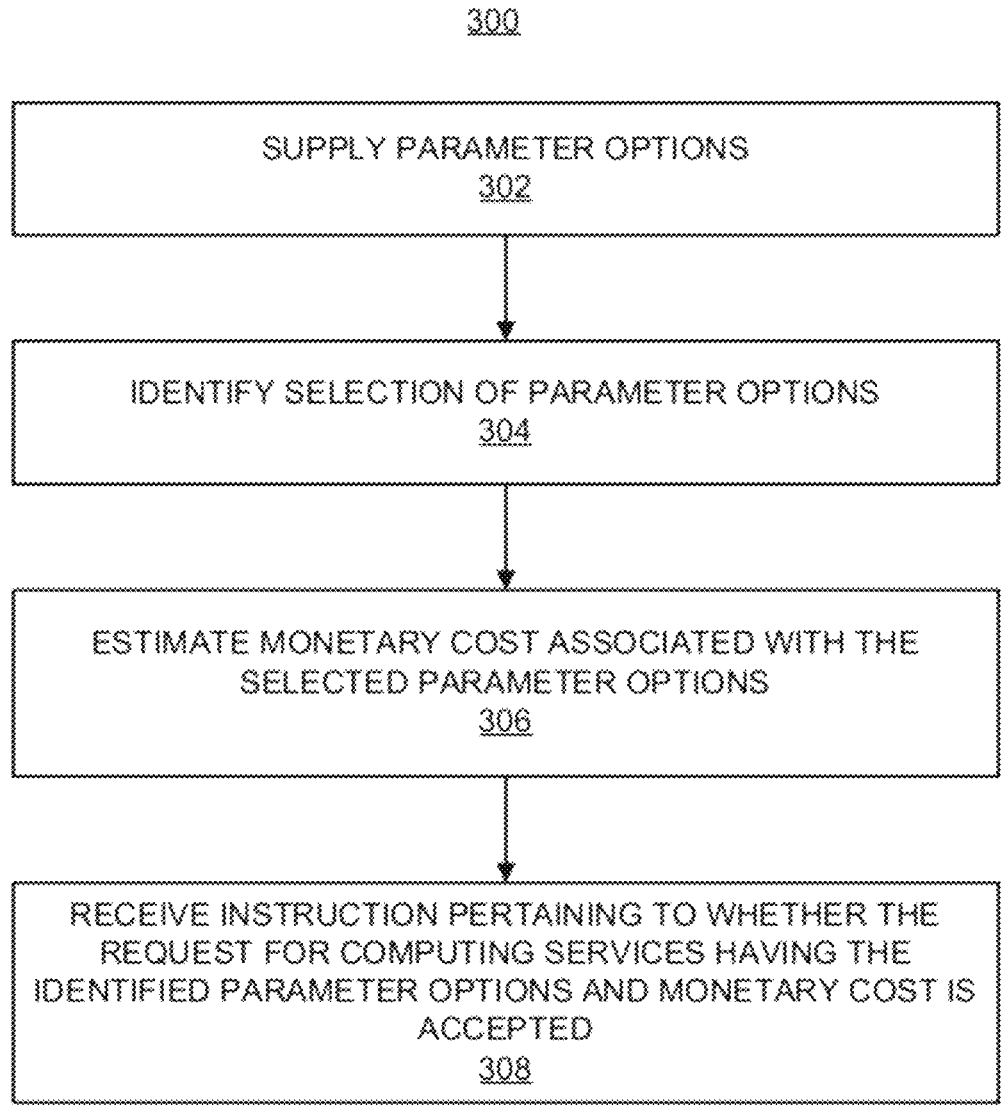
FIG. 3A illustrates a flow diagram of a method for implementing a service entry interface tool, according to an example of the present disclosure.
Figure 3B:
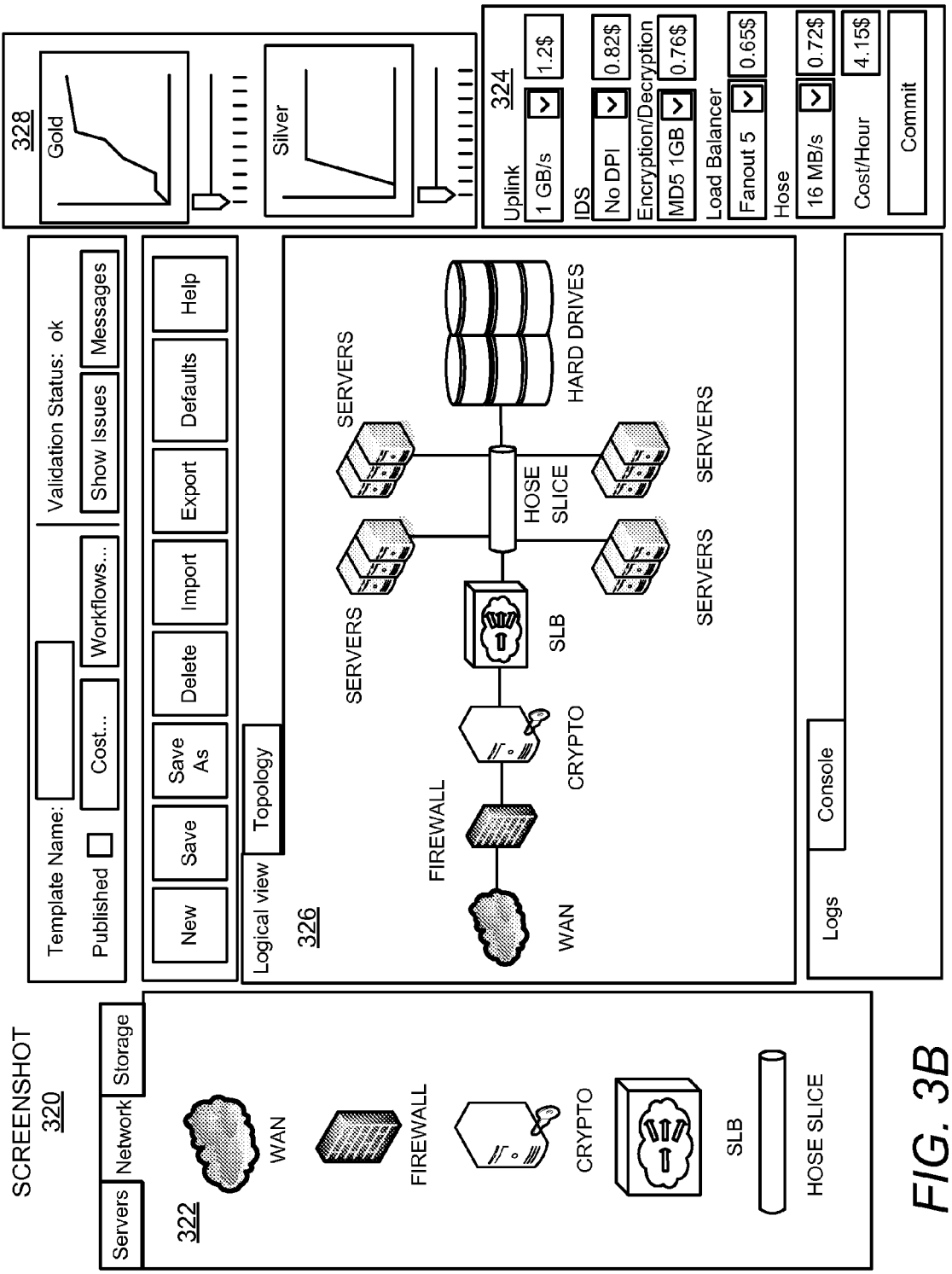
FIG. 3B depicts a screenshot of a service entry interface through which a user may enter desired parameters for the computing service, according to an example of the present disclosure.

With particular reference to FIG. 3A, and as shown at block 302, a plurality of parameter options are supplied, for instance, as shown in the screenshot 320 (FIG. 3B). As shown in the screenshot 320, the plurality of parameter options may include, for instance, various types of servers, various networking component options, various storage component options, various bandwidth options, various encryption/decryption options, etc. The screenshot 320, more particularly, depicts an options window 322 that displays various options available to a user in setting up an application and an options window 324 that displays various other options and costs associated with the selection of the options. The screenshot 320 has also been depicted as displaying various other elements, such as, various file naming and status information, various file management options, file logs, etc.

The options window 322 is depicted as displaying a wide area network (WAN), a firewall, a server for providing cryptographic functions (CRYPTO), a server load balancer (SLB), and a hose slice. It should, however, be clearly understood that the user may be provided with any number of additional networking options without departing from a scope of the service entry interface tool 422 disclosed herein. In addition to the networking options, the options window 322 may include options for various types of severs and server clusters, as well as options for storage, as indicated by the tabs labeled as "Servers" and "Storage" in the options 322 window.

The options window 324 is depicted as displaying an uplink bandwidth selection, a intrusion detection system selection, an encryption/decryption selection, a load balancer selection, and a hose-slice selection, along with their related costs. Although particular options have been depicted in the options window 324, it should be clearly understood that additional options may be added and existing options may be modified and/or removed without departing from a scope of the service entry interface tool 422.

At block 304, the plurality of parameter options that have been selected are identified, in which, the plurality of parameter options includes at least one flow-slice. A flow-slice may generally be defined as a network abstraction of network pay-per-use unit. More particularly, a flow-slice may comprise a definable unit of network use that includes one or more parameters associated with the network use for which the user is willing to pay, such as, but not limited to network bandwidth consumed by that particular flow-slice and an associated monetary cost that depends on bandwidth usage. For instance, the flow-slice defines the bandwidth, if encryption properties are required, if load balancing properties are required, whether the flow-slice will connect groups of servers, etc. According to an example, the service entry interface tool 422 automatically defines the flow-slices based upon the selected parameter options. In this example, and with reference to FIG. 3B, the user may select the parameter options as indicated in the window 326, which shows an arrangement of the selected options.

Flow-slices may also have various secondary properties tied to them, such as, service level agreement (SLA) guarantees (which may include QoS-levels, downtime guarantees, loss-rates, bandwidth guarantees, delay guarantees), encryption (which may include that all of the communication for the flow-slice is encrypted), load-balancing (which may include that the network load will be equally shared across the server-group that binds to it), firewalling (which may include that the flow-slice traffic will be filtered against a firewall ruleset) with an additional cost beyond base network bandwidth cost associated with each property, etc. In this regard, the flow-slice is a level of abstraction that captures the middlebox services, such as, load-balancers, encryption boxes, intrusion detection systems (IDS's), etc.

The window 324 shows an example in which the user selected a WAN, a firewall, a CRYPTO, an SLB, a hose slice, a particular amount of computing performance represented by the four sets of three servers, and a particular amount of memory usage represented by the six hard drives. In this example, the service entry interface tool 422 may define a first flow-slice as the connection between the WAN and the load balancer. In addition, the service entry interface tool 422 may define a second flow-slice as the shared connections between the groups of servers, the load-balancer, and the hard drives. In this example, the first flow-slice may be construed as a first type of flow-slice called a pipe-slice and the second flow-slice may be construed as a second type of flow-slice called a hose-slice. Pipe-slices connect pairs of end-point networking components to each other and thus represent resources that are typically not shared. Hose-slices connect groups of end-point networking components together and thus represent resources that are typically shared. Since the hose-slices require greater network resources, such as, but not limited to bandwidth, the hose-slices may be associated with a higher monetary cost as compared with the pipe-slices. While the secondary properties associated with flow-slices are generally dictated by the use-scenarios (for instance, whether the application requires encryption or load-balancing), the primary property of network bandwidth depends on the application workload patterns.

The service entry interface tool 422 may also profile and plot the bandwidth consumed by the identified flow-slices and the selected infrastructure components 142a-142n. The profiling and plotting of the network bandwidth consumed may be performed using, for instance, sFlow packet sampling technology to measure inter-server communications. It should be noted that since generally each server instance is associated with a unique media access control (MAC) address and each virtual machine (VM) with a Virtual MAC, the communication between pairs of MAC addresses may be tracked. As shown in the screenshot 320, the window 326 may also depict the topology of the network containing the user-selected networking options 322.

Flow-slices are bound to physical servers, virtual machine (VM) instances, server group instances, storage instances, etc. In addition, and flow-slices may specify network-policy associated with a particular server, such as, for instance, Access Control List (ACL) rules that denote which devices are allowed to talk to the particular server, quality of service (QoS) levels, etc. Flow-slice parameters generally follow VM-server instances to which they are bound when VMs move around.

As further shown in FIG. 3, the screenshot 320 includes a window 328 that includes options for the user to customize levels of QoS. More particularly, the user may customize the desired level of QoS to be met in performing the computing service for the user, which have been depicted as including a gold level and a silver level. It should be understood that other levels of QoS may be displayed in the window 328, such as a bronze level, or additional levels. In any regard, the levels of QoS depicted in the window 328 generally comprise QoS levels that are associated with different flows between the same set of servers. It should be noted that the QoS codepoint may generally be tagged to the packet by the upstream switch connected to the server depending on some attribute, such as, destination TCP port.

According to an example, the graphs depicted in the window 328 pertaining to the different QoS levels may be generated through the plotting of the 95th percentile cumulative distribution functions (CDF) of the measured bandwidth consumption between server pairs. The user may then use the observed CDF patterns to select the bandwidth parameters for the flow-slice(s). For simple unimodal scenarios, the knee of the CDF curve decides the bandwidth consumption of the flow-slice(s). This value may be multiplied with an over-provisioning ratio, for instance, a number between 1 and 10, to accommodate traffic burstiness and unpredictability.

As shown in the window 328, the gold CDF distribution is tri-modal in nature. Thus, for such a distribution, the user may choose two threshold points to divide the total bandwidth of the hose-slice among three pipe-slices rather than using a single hose-slice and thereby reduce the monetary cost of the hose-slice. Therefore, for instance, based on observed data-patterns, the flow-slice bandwidth may be reprovisioned by dividing existing flow-slices into multiple smaller flow-slices to reduce the monetary cost associated with selected components and configurations. It should be noted that pipe-slices may instead be used between special server nodes, for instance, for back-up purposes, for VMotion, etc. Thus, for the best price-performance ratio, a combination of pipe and hose slices that best suit the application requirements may be recommended. When the number of customer VM instances cannot be measured directly due to the constraints imposed by the test-environment, flow-slice bandwidths may be scaled commensurately based on the ratio of VM's of each type of the test setup to the production setup.

Although not explicitly depicted in FIG. 3B, the service entry interface tool 422 may also monitor the selected configurations for potential SLA violations. Thus, for instance, the service entry interface tool 422 may compare various selected characteristics, such as, security features, bandwidth considerations, storage, etc., with the provisions set forth in an SLA to determine whether the provisions are likely to be violated. In addition, in response to a determination that one or more of the provisions in the SLA are likely to be violated, the service entry interface tool 422 may inform the user that the selected configuration is likely to violate the provisions. The service entry interface tool 422 may thus be considered as a test environment through which a user may test various server and network configurations to determine a configuration that results in the desired network characteristics, while substantially minimizing monetary costs associated with obtaining the desired network characteristics and while meeting the provisions of the SLA. In addition, the service entry interface tool 422 enables the bandwidth requirements of the flow-slices to the extracted from the selected network configuration. It should be noted that, in general, the application architecture and requirements determine the secondary properties of the flow-slices while profiling enables the user to judge the network consumption of the application.

At step 306, a monetary cost associated with the selected plurality of parameter options, including the flow-slices, is estimated. As shown in the window 324, the total monetary cost per hour resulting from the selected options and configurations may be displayed to the user. The window 324 also shows a breakdown of the costs associated with various parameters, some of which the user may vary to modify the total cost.

At step 308, an instruction pertaining to whether the request for computing service having the identified parameter options and monetary cost has been accepted is received. As shown in the window 324, a commit button is provided for the user to select in response to a determination that the user wishes to submit the request with the selected parameter options. As such, if the user accepts the total monetary cost that results from the selected options, the user may select the commit button and submit the request for the computing service to be performed. Otherwise, the user may vary one or more of the selected options to arrive at a different total monetary cost. In this regard, the user may vary the selected options over a number of iterations until the user selects a configuration that results in an acceptable or desired monetary cost.

With reference back to FIG. 2, at block 204, a service request including a flow-slice selection is received, for instance, by the user interface module 122. Thus, for instance, block 204 may follow submission of the service request by the service entry interface tool 422. The service entry interface tool 422 may be configured to communicate the selected parameter options to the cloud-based computing service providing apparatus 100 through the network 150.

At block 206, workloads to be performed by a plurality of infrastructure components 142a-142n to satisfy the selected configuration and the flow-slice(s) are estimated, for instance, by the workload estimation module 124. The workload estimation module 124 may determine the workloads to be performed by the infrastructure components 142a-142n through an analysis of the provisions resulting from the user-selected options. Thus, for instance, the workload estimation module 124 may determine at least one of the number of servers, the number of disk drives, the type of server load balancer to be implemented, etc., required to perform the requested computing service.

At step 208, a provisioning scheme for the infrastructure components 142a-142n is determined, for instance, by the provisioning scheme determination module 126. The provisioning scheme determination module 126 may, for instance, determine which of the servers, hard drives, network switches, etc., are to be implemented to implement the estimated workloads on the infrastructure components 142a-142n based upon the configuration of the computing infrastructure 140. In this regard, the provisioning scheme determination module 126 may identify various paths between end-point infrastructure components 142a-142n that are to be employed in implementing the estimated workloads.

The provisioning scheme determination module 126 may determine the provisioning scheme by mapping the flow-slice(s) to the infrastructure components 142a-142n. More particularly, for instance, the provisioning scheme determination module 126 may map the pipe-slices and the hose-slices to respective virtual local area networks (VLAN) in the plurality of infrastructure components 142a-142n. As another example, the provisioning scheme determination module 126 may employ virtual routing and forwarding (VRF) instances to map the pipe-slices and the hose-slices to respective infrastructure components 142a-142n. In any regard, the provisioning scheme determination module 126 may find the shortest paths among the infrastructure components 142a-142n that substantially match a network bandwidth consumption parameter of the flow-slices.

According to another example, the provisioning scheme determination module 126 maps the pipe-slices by finding paths in a network topology of the infrastructure components 142a-142n that connect two end-point infrastructure components 142a-142n that meet a network bandwidth constraint of the infrastructure components while minimizing total capacity utilization of the infrastructure components. In addition, the provisioning scheme determination module 126 may map the hose-slices finding trees in the network topology that connect at least two groups of end-point infrastructure components 142a-142n.

According to a further example in which the infrastructure components 142a-142n include network switches, the provisioning scheme determination module 126 dedicates each of the VLANs (or VRF instances) to the mapped pipe-slices and the mapped hose-slices. In addition, the provisioning scheme determination module 126 tags ports of a plurality of the network switches corresponding to the path and tree onto the dedicated VLANs (or VRF instances) to configure the infrastructure components 142a-142n to perform the requested service.

At step 210, the determined provisioning scheme is implemented in the infrastructure components 142a-142n, for instance, by the provisioning scheme implementation module 128, to perform the requested computing service for the user. The results of the performed computing service may also be forwarded to the user.

Some or all of the operations set forth in the figures may be contained as a utility, program, or subprogram, in any desired computer readable storage medium. In addition, the operations may be embodied by computer programs, which may exist in a variety of forms both active and inactive. For example, they may exist as machine readable instruction(s) comprised of program instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 4:
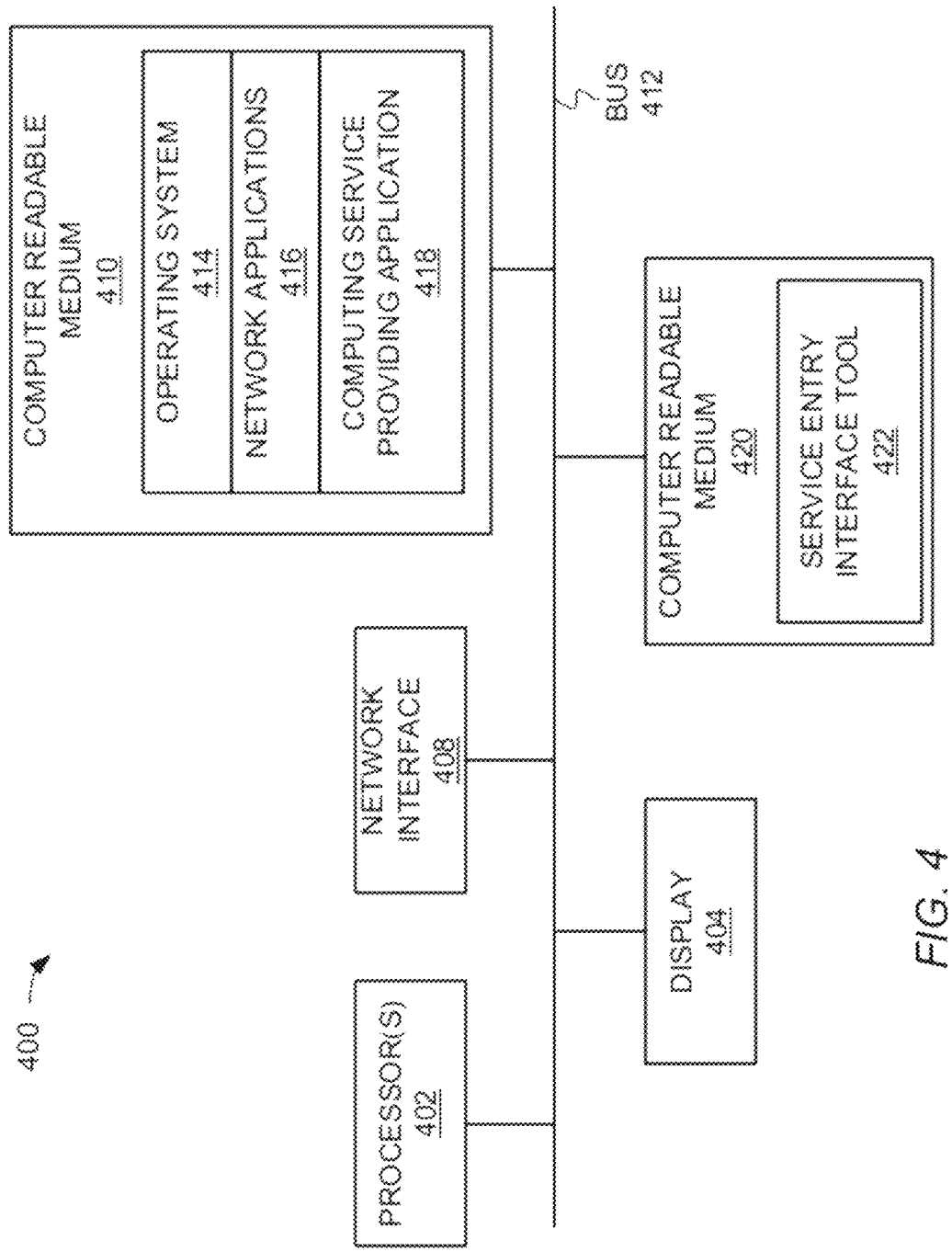
FIG. 4 illustrates a block diagram of a computing apparatus configured to implement one or both of the methods depicted in FIGS. 2 and 3A, according to example of the present disclosure.

Turning now to FIG. 4, there is shown a schematic representation of a computing device 400 that may be used as a platform for implementing or executing the processes depicted in either or both of FIGS. 2 and 3A, according an example. The device 400 includes one or more processors 402, such as a central processing unit; one or more display devices 404, such as a monitor; one or more network interfaces 408, such as a Local Area Network LAN, a wireless 802.11x LAN, a 3G mobile WAN or a WiMax WAN; and one or more computer-readable mediums 410 and 420. Each of these components is operatively coupled to one or more buses 412. For example, the bus 412 may be an EISA, a PCI, a USB, a FireWire, a NuBus, or a PDS.

The computer readable mediums 410 and 420 may be any suitable medium that participates in providing instructions to the processor 402 for execution. For example, the computer readable mediums 410 and 420 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 410 has been depicted as also storing other machine readable instruction applications, including word processors, browsers, email, Instant Messaging, media players, and telephony machine readable instructions.

The computer-readable medium 410 has also been depicted as storing an operating system 414, such as Mac OS, MS Windows, Unix, or Linux; network applications 416; and a computing service providing application 418. The operating system 414 may be multi-user, multiprocessing, multitasking, multithreading, real-time and the like. The operating system 414 may also perform basic tasks, such as recognizing input from input devices, such as a keyboard or a keypad; sending output to the display 404 and the design tool 406; keeping track of files and directories on medium 410; controlling peripheral devices, such as disk drives, printers, image capture device; and managing traffic on the one or more buses 412. The network applications 416 include various components for establishing and maintaining network connections, such as machine readable instructions for implementing communication protocols including TCP/IP, HTTP, Ethernet, USB, and FireWire.

The computing service providing application 418 provides various components with machine readable instructions for providing computing services to users, as described above. In certain examples, some or all of the processes performed by the application 418 may be integrated into the operating system 414. The computer readable medium 420 has been depicted as storing a service entry interface tool 422, which provides various components with machine readable instructions for providing an interface through which users input computing service requests. In certain examples, the processes may be at least partially implemented in digital electronic circuitry, or in computer hardware, machine readable instructions (including firmware and/or software) or in any combination thereof.

What has been described and illustrated herein are various examples of the disclosure along with some of their variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for providing a cloud-based computing service to a user, said method comprising:
receiving a request for the computing service to be performed for the user, wherein the request includes a selection of at least one flow-slice, said at least one flow-slice comprising a unit of network use that is defined based upon a user selection of a subset of a plurality of parameter options associated with the network use and a user selection of at least one connection between the selected subset of the plurality of parameter options, and wherein the at least one flow-slice comprises a first type of flow-slice and a second type of flow-slice, wherein the first type of flow-slice includes a connection that connects a pair of end-point networking components to each other, wherein the second type of flow-slice includes a connection that connects groups of end-point infrastructure components together;
estimating workloads to be performed by a plurality of infrastructure components to satisfy the user-selected subset of the plurality of parameter options and the at least one connection between the selected subset of the plurality of parameter options of the at least one flow-slice; and
determining, using a processor, a provisioning scheme for the plurality of infrastructure components to implement the estimated workloads on the plurality of infrastructure components.

2. The method according to claim 1, wherein the plurality of parameter options comprises server options, networking component options, storage component options, bandwidth consumption options, encryption/decryption options, of use of firewalls options and use of load-balancing options.

3. The method according to claim 1, wherein receiving the request for the service further comprises receiving a request that includes a selection of at least one of the first type of flow-slice and at least one of the second type of flow-slice.

4. The method according to claim 3, wherein determining the provisioning scheme for the plurality of infrastructure components further comprises mapping the at least one first type of flow-slice and the at least one of the second type of flow-slice to at least one of a respective virtual local area network (VLAN) and a respective virtual routing and forwarding (VRF) instance to the plurality of infrastructure components.

5. The method according to claim 4, wherein mapping further comprises:
for the at least one first type of flow-slice, finding a path in a network topology of the plurality of infrastructure components that connects two end-point infrastructure components of the plurality of infrastructure components that meets a network bandwidth constraint of the plurality of infrastructure components while minimizing total capacity utilization of the plurality of infrastructure components; and for the at least one second type of flow-slice, finding a tree in the network topology that connects at least two groups of end-point infrastructure components.

6. The method according to claim 5, wherein the plurality of infrastructure components comprise network switches, said method further comprising:

dedicating each of the at least one of the VLANs and the VRF instances to the mapped at least one of the first type of flow-slice and the at least one of the second type of flow-slice; and tagging ports of a plurality of the network switches corresponding to the path and tree onto the dedicated at least one of the VLANs and the VRF instances to configure the plurality of infrastructure components to perform the requested service.

7. The method according to claim 1, further comprising:

supplying the user with an interface through which the user is provided with graphical representations of the plurality of parameter options and a plurality of connection options, wherein the user is to select the subset of the plurality of parameter options and the at least one connection through a graphical positioning of the selected subset of the plurality of parameter options and the at least one connection; and wherein receiving the request for the service further comprises receiving the request for the service through the interface.

8. The method according to claim 7, wherein the interface is to provision the at least one flow-slice subject to at least one provision contained in a service level agreement.

9. The method according to claim 7, wherein the interface is to provide the user with an indication of a quality of service level and a monetary cost corresponding to the selected subset of the plurality of parameter options and at least one connection, and wherein the quality of service and the monetary cost are to vary with selection of at least one different subset of a plurality of parameter options and at least one connection.

10. An apparatus for provisioning infrastructure components for providing a cloud-based computing service to a user, said apparatus comprising:

a processor; and a memory on which is stored machine readable instructions that cause the processor to:

receive a request for the computing service to be performed for the user, wherein the request includes a selection of at least one flow-slice, said at least one flow-slice comprising a unit of network use that is defined based upon a user selection of a subset of a plurality of parameter options associated with the network use and a user selection of at least one connection between the selected subset of the plurality of parameter options, and wherein the at least one flow-slice comprises a first type of flow-slice and a second type of flow-slice, wherein the first type of flow-slice includes a connection that connects a pair of end-point networking components to each other, wherein the second type of flow-slice includes a connection that connects groups of end-point infrastructure components together;

estimate workloads to be performed by the infrastructure components to satisfy the user-selected subset of the plurality of parameter options and the at least one connection between the selected subset of the plural of parameter options of the at least one flow-slice; and determine a provisioning scheme for the networking components to implement the estimated workloads.

11. The apparatus according to claim 10, wherein the plurality of parameter options comprises server options, networking component options, storage component options, bandwidth consumption options, encryption/decryption options, of use of firewalls options and use of load-balancing options.

12. The apparatus according to claim 10, wherein receiving the request for the service further comprises receiving a request that includes a selection of at least one of the first type of flow-slice and at least one of the second type of flow-slice.

13. The apparatus according to claim 12, wherein the machine readable instructions, to determine the provisioning scheme for the plurality of infrastructure components, are further to map the at least one first type of flow-slice and the at least one of the second type of flow-slice to at least one of a respective virtual local area network (VLAN) and a respective virtual routing and forwarding (VRF) instance to the plurality of infrastructure components in the plurality of infrastructure components.

14. The apparatus according to claim 13, wherein for the at least one first type of flow-slice, the machine readable instructions are further to find a path in a network topology of the plurality of infrastructure components that connects two end-point infrastructure components of the plurality of infrastructure components that meets a network bandwidth constraint of the plurality of infrastructure components while minimizing total capacity utilization of the plurality of infrastructure components and for the at least one second type of flow-slice, the at least one module is further to find a tree in the network topology that connects at least two groups of end-point infrastructure components.

15. The apparatus according to claim 14, wherein the plurality of infrastructure components comprise network switches, and wherein the machine readable instructions are further to dedicate each of the at least one of the VLANs and the VRF instances to the mapped at least one of the first type of flow-slice and the at least one of the second type of flow-slice and to tag ports of a plurality of the network switches corresponding to the path and tree onto the dedicated at least one of the VLANs and the VRF instances to configure the plurality of infrastructure components to perform the requested service.

16. The apparatus according to claim 10, wherein the at least one module is further to supply the user with an interface through which the user is to be provided with graphical representations of the plurality of parameter options and a plurality of connection options, wherein the user is to select the subset of the plurality of parameter options and the at least one connection through a graphical positioning of the selected subset of the plurality of parameter options and the at least one connection with respect to each other, and to receive the request for the service through the interface.

17. The apparatus according to claim 16, wherein the interface is to provide the user with an indication of a quality of service level and a monetary cost associated with the selected subset of the plurality of parameter options and the at least one connection, and wherein the quality of service level and the monetary cost are to vary with selection of at least one different subset of a plurality of parameter options and at least one connection.

18. A non-transitory computer readable storage medium on which is embedded at least one computer program, said at least one computer program implementing a method for providing a cloud-based computing service to a user, said at least one computer program comprising a set of instructions to:

receive a request for the computing service to be performed for the user, wherein the request includes a selection of at least one flow-slice, said at least one flow-slice comprising a unit of network use that is defined based upon a user selection of a subset of a plurality of parameter options associated with the network use and a user selection of at least one connection between the selected subset of the plurality of parameter options, wherein the plurality of parameter options comprises parameter options selected from the group consisting of server options, networking component options, storage component options, bandwidth consumption options, encryption/decryption options, of use of firewalls options and use of load-balancing options, and wherein the at least one flow-slice comprises a first type of flow-slice and a second type of flow-slice, wherein the first type of flow-slice includes a connection that connects a pair of end-point networking components to each other, wherein the second type of flow-slice includes a connection that connects groups of end-point infrastructure components together;

estimate workloads to be performed by a plurality of infrastructure components to satisfy the user-selected subset of the plurality of parameter options and the at least one connection between the selected subset of the plurality of parameter options of the at least one flow-slice; and determine a provisioning scheme for the plurality of infrastructure components to implement the estimated workloads on the plurality of infrastructure components.

19. A non-transitory computer readable storage medium on which is embedded at least one computer program, said at least one computer program implementing a service entry interface tool, said at least one computer program comprising a set of instructions that when executed by a processor cause the processor to:

supply a plurality of parameter options and connection options pertaining to a request for a computing service, wherein a user is to select a subset of the plurality of parameter options and at least one of the connection options to connect the selected subset of the plurality of parameter options to each other, and wherein the connection options comprise a first type of flow-slice and a second type of flow-slice, wherein the first type of flow-slice includes a connection that connects a pair of end-point networking components to each other, wherein the second type of flow-slice includes a connection that connects groups of end-point infrastructure components together;

identify the subset of the plurality of parameter options and the at least one connection option that have been selected by the user;

estimate a monetary cost associated with the selected subset of the plurality of parameter options and the at least one connection;

output the estimated monetary cost associated with the selected subset of the plurality of parameter options and the at least one connection; and receive an instruction pertaining to whether the request for computing service satisfying the selected subset of the plurality of parameter options and the at least one connection, and having the estimated monetary cost is accepted by a cloud-based computing service.

20. The non-transitory computer readable storage medium according to claim 19, wherein the plurality of parameter options comprises parameter options selected from the group consisting of server options, networking component options, storage component options, bandwidth consumption options, encryption/decryption options, of use of firewalls options and use of load-balancing options.

* * * * *